United States Patent Office 2,952,576
Patented Sept. 13, 1960

2,952,576

GLASS FIBER TREATED WITH THE REACTION PRODUCT OF A LIQUID POLYMER OF A CONJUGATED DIENE AND SILICON HALIDE

Charles E. Wheelock and Peter J. Canterino, Bartlesville, Okla., assignors to Phillips Petroleum Company, a corporation of Delaware No Drawing. Filed Nov. 2, 1955, Ser. No. 544,608

14 Claims. (Cl. 154—46)

This invention relates to a finish for glass fiber. In one of its aspects, this invention relates to a finish for glass fiber for use in laminates. In another aspect, this invention relates to a laminate of glass fiber, said fiber having a particular finishing treatment.

When preparing laminates from glass fiber and polyester resins or other resins, the glass fibers are frequently, and preferably, first treated with a finishing material so as to promote a strong bond between the resin and the fiber. That is, an untreated glass will not bond strongly to many laminating resins. The ideal finish would be of such a type that it will form a chemical bond with both the glass and with the laminating resin. Many finishes have been used for such purposes including certain silicon compounds containing unsaturated groupings, such as vinyl silicones and addition products of rubbery polymers with silicon halides. While such compounds have been beneficial, they do not have flexural strength as great as is often desired.

It is an object of this invention to provide a finish for glass fiber which bonds strongly to the glass fiber and to thermosetting resins.

Another object of this invention is to provide a glass fiber having a finish bonded strongly thereto and which is capable of forming a strong bond to laminating resins.

Still another object of this invention is to provide a strongly bonded laminate of glass fibers and a laminating resin, said laminate having high flexural strength.

Still other objects and advantages of this invention will be apparent to those skilled in the art having been given this disclosure.

According to this invention, glass fiber is treated with the addition product of a liquid conjugated diene polymer and a silicon halide. Also, laminates can be prepared from such a treated fiber.

As has been indicated, such a treated fiber is sold as an article of commerce for use in laminates, shower curtains, drapes, etc. The fiber can be laminated in a thermosetting or thermoplastic resin for use in such articles as boat hulls, automobile bodies, etc. or can be laminated to a different material, e.g. a cotton cloth.

The use of laminates has been indicated above. The thermosetting or thermoplastic laminates prepared with a fiber treated according to this invention will have exceptionally high flexural and bonding strengths and will have high impact resistance. The silicon halide-liquid polymer reaction product forms a chemical bond to both the glass and to the laminating resin.

Alkyd or polyester resins are most frequently employed in the preparation of laminates. Such resins are well known in the art and need no discussion here. Polyester resins especially useful in this invention can be prepared by reacting a polyhydric alcohol with an unsaturated polycarboxylic acid such as by esterification of an alpha,beta unsaturated dicarboxylic acid with a glycol.

One thermosetting resin of particular value is prepared by blending a polyester resin with styrene wherein the styrene is used in the range of 25 to 50 weight parts per 100 parts of blend. Copending application of Charles E. Wheelock having Serial No. 473,040, filed December 3, 1954, now Patent No. 2,898,259, describes and claims an alkyd resin of high flexural strength which is particularly useful in conjunction with the treated fiber of this invention for preparing laminates. According to that invention, the resin comprises (A) 10 to 90 weight parts of an unsaturated polyester resin per 100 parts total resin and (B) 90 to 10 weight parts of a mixture of a heterocyclic nitrogen containing monomer such as a vinylpyridine or a vinylquinoline with a vinyl aromatic hydrocarbon such as styrene wherein the heterocyclic nitrogen monomers comprised 2 to 90 weight parts of the B mixture. Still another resin useful in this invention is described and claimed in the copending application of Charles E. Wheelock having Serial No. 516,408, filed June 20, 1955, now U.S. 2,919,220; according to that invention a resin is prepared by admixing a liquid polymer or copolymer of a conjugated diene with 1 to 70 weight parts per 100 parts of total composition of an ester of an acid selected from the group consisting of acrylic, methacrylic and cyanuric.

A transparent resin useful in this invention is described and claimed in the copending application of Charles E. Wheelock having Serial No. 512,229, filed May 31, 1955, now abandoned. According to that invention a blend of a liquid polybutadiene prepared by sodium polymerization and a monomer selected from the group consisting of styrene, alpha-methyl styrene and nuclear substituents thereof is cured at a temperature of not less than 150° C. to give transparent resins.

The above resins are typical of the preferred thermosetting resins of this invention. However, to those skilled in the art, it will be obvious that any of the thermosetting or thermoplastic resins commonly used as coating resins and/or as laminating resins can be used with the treated glass fiber of this invention and obtain the advantages thereof.

The liquid conjugated diene polymers or copolymers preferred in this invention are prepared by mass polymerization, i.e. alkali metal catalyzed or particularly sodium catalyzed in mass. However, liquid polymers of conjugated dienes (including copolymers) prepared by any method known to the art can be used, the important features being that the polymer or copolymer is liquid and not rubber. In mass polymerization, monomers which are attacked by the catalyst would not be used and if it is desired to use such monomers, emulsion or solution polymerization can be resorted to. The amount of conjugated dienes employed in the production of the polymers will generally be in the range between 5 and 100 parts by weight per 100 parts of monomeric material and preferably in the range of 50 to 100 parts conjugated diene per 100 parts total monomers. The total amount of copolymerizable monomer employed is limited by the amount of such monomers which can be used and still obtain a liquid polymer.

The conjugated diene of the most importance commercially is butadiene-1,3, however, as will be understood by those skilled in the art, other conjugated dienes can be employed as the conjugated diene of the liquid polymer. Of particular value are those conjugated dienes which contain four to eight, inclusive, carbon atoms per molecule and include 1,3-butadiene, isoprene (2-methyl-1,3-butadiene), piperylene, 2-methyl-1,3-pentadiene, 2,3-dimethyl-1,3-butadiene, chloroprene, bromoprene, and the like. With a greater number of carbon atoms, the polymerization rate decreases somewhat and there are so many isomers that it is not practical with present procedures, to provide pure compounds. However, in a broader aspect of this invention, conjugated dienes having more than eight, such as twelve, carbon atoms per molecule can be used, particularly where the presence of various isomeric compounds can be tolerated. Furthermore, various alkoxy, such as methoxy and ethoxy, and cyano derivatives of the conjugated dienes, are also applicable. Thus dienes such as phenylbutadiene, 2,3 - dimethyl - 1,3 - hexadiene, 2-methoxy-3-ethylbutadiene, 2-ethoxy-3-ethyl-1,3-hexadiene, 2-cyano-1,3-butadiene, and 2,3-diethyl-1,3-octadiene are applicable in this invention. It is also within the scope of this invention to use a mixture of such conjugated dienes.

Monomers copolymerizable with the conjugated dienes and useful in this invention include those monomers having a $CH_2=C<$ group such as heterocyclic nitrogen bases particularly of the pyridine, quinoline, and isoquinoline series; aryl olefins; acrylic and substituted acrylic acids, esters, nitriles, and amides thereof; ketones; ethers; and halides. Examples of such compounds which can be employed in the practice of this invention include 2-vinyl-5-ethylpyridine, 2-methyl-5-vinylpyridine, 4-vinylpyridine, 2,3,4 - triethyl - 5 - vinylpyridine, 3,4,5,6 - tetramethyl - 2 - vinylpyridine, 2-isopropyl-4-nonyl-5-vinylpyridine, 2,4-dimethyl-5,6-diphenyl-3-vinylpyridine, 2-methoxy-4-chloro-6-vinylpyridine, 2-vinylquinoline, 2-vinyl-4-ethylquinoline, 3-vinylisoquinoline, styrene, various alkyl and substituted alkyl styrenes of the type mentioned, alpha-methylstyrene 3-phenyl-3-butene-1-ol, p-chlorostyrene, p-methoxystyrene, vinylnaphthalene, acrylic acid, methacrylic acid, methyl acrylate, ethyl acrylate, methyl methacrylate, ethyl methacrylate, butyl methacrylate, methyl ethacrylate, methyl alpha-chloroacrylate, acrylonitrile, methacrylonitrile, methacrylamide, methyl isopropenyl ketone, methyl vinyl ketone, methyl vinyl ether, vinyl acetate, vinyl chloride, vinylidene chloride, vinylfurane, vinylcarbazole, vinylacetylene and the like. All of the foregoing are applicable in preparing liquid copolymers with conjugated dienes and in particular with 1,3-butadiene. However, those skilled in the art will recognize that other copolymerizable monomers known in the art are applicable. As has been stated, sufficient conjugated diene should be used to insure a liquid polymer and a polymerization system used which will be compatible with the comonomer chosen. For example, sodium polymerization would not be employed with acid monomers. In particular, we prefer to use at least 50 weight parts of conjugated diene per 100 parts of total monomers with a copolymerizable monomer compatible in a sodium polymerization system, i.e. we prefer a mass polymerized liquid polymer. In particular, we prefer, the conjugated diene and an aryl olefin, e.g. butadiene and styrene or an alkyl substituted styrene.

The silicon halides which are applicable in this invention are reacted with the liquid polymer are of the type having a general formula such as:

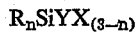

$$R_nSiYX_{(3-n)}$$

wherein R is an alkyl or alkoxy group of 1 to 4 carbon atoms, a phenyl or a phenoxy group, n is 0, 1 or 2, X is chlorine or bromine and Y is X or hydrogen, if 3—n is greater than 1 each X can be the same or different. Silicon halides useful in our invention include trichlorosilane, tribromosilane, methyldichlorosilane, ethyldibromosilane, isopropyldichlorosilane, n-butyldibromosilane, phenyldichlorosilane, dimethylchlorosilane, trichloromethylsilane, dichlorodimethylsilane, butylchlorodibromosilane, butoxybromodichlorosilane and the like.

The amount of silicon halide employed is that which is sufficient to react with from 1–75 percent of the double bonds in the conjugated diene polymer. Bonding of the addition compound to the glass fiber occurs by virtue of the reactive units along the polymer chain which contain silicon. Bonding of the addition compound to the laminating resin is made possible through the ethylenic bonds along the polymer chain which can undergo copolymerization with the laminating resin, e.g., an unsaturated polyester resin, liquid polybutadiene, and the like. It is essential for the successful operation of this invention that some double bonds be present which can enter into reaction with the laminating resin and form chemical bonds therewith.

The preparation of the addition compound of a silicon halide with a liquid conjugated diene polymer is effected at temperatures generally in the range between 15° and 250° C. and preferably below 175° C. Operating conditions are chosen to prevent cross-linking of the polymer. A solvent such as carbon tetrachloride, chloroform, benzene, methylcyclohexane, cyclohexane, xylene or toluene is frequently used but is not essential. The reaction may be catalyzed with ultraviolet light or a peroxide type catalyst such as benzoyl peroxide, and it may be effected at atmospheric pressure or above. The time required for formation of the addition compound will depend upon such factors as the polymer used, the temperature, and the catalyst, and will be in the range between 5 and 24 hours or longer.

Application of the liquid conjugated diene polymer-silicon halide addition compound to glass fiber may be accomplished by using a solution or aqueous emulsion of the addition compound and dipping or spraying it onto the glass fiber, running the fiber through rollers, etc. The glass fiber, after being contacted with the addition compound, is baked at a temperature in the range between 30° and 175° C. for a time in the range between 30 minutes and 100 hours, generally 50 hours or less, depending upon the temperature.

The liquid conjugated diene polymer-silicon halide addition compounds of this invention will function as sizing agents as well as finishes for glass fibers. A size is a material originally applied during the manufacturing process but is generally removed prior to application of the finish.

Laminated objects can be readily fabricated from the finished glass fibers to give structures having unexpectedly high flexural strength, high bonding strength and good impact resistance.

The advantage of this invention can be best illustrated by examples. In order to compare results and to simplify the discussion and to provide a direct comparison with certain prior art laminates, these examples are limited to a sole liquid polymer, namely liquid polybutadiene prepared by sodium polymerization, and a sole silicon halide, namely trichlorosilane. The results are compared using the same silicon halide with a rubbery polybutadiene.

*Example I*

Liquid polybutadiene, prepared by mass polymerization using finely divided sodium as the catalyst, having a viscosity of 1362 Saybolt Furol seconds at 100° F. and a Gardner color of 11, was stripped in a batch operation by vigorous flushing of nitrogen through the polymer. The polymer was charged to a pot and heated in an oil bath which had a temperature of 380–400° F. The pot was evacuated to 10–20 mm. mercury and the pressure was maintained at this level while nitrogen was flushed through the polymer over a 45-minute period.

Two finishes were prepared for Fiberglas cloth, one derived from the liquid polybutadiene described above and the other from a 42 Mooney (ML-4) polybutadiene rubber prepared by emulsion polymerization at 41° F. The finishes were prepared in the following manner:

(1)

| | |
|---|---|
| Liquid polybutadiene _____grams__ | 200 |
| Trichlorosilane _____ml__ | 50 |
| Toluene _____ml__ | 1000 |

The ingredients were stirred and irradiated with ultraviolet light in a closed reactor at room temperature (approximately 25° C.) for 12 hours. A 100 ml. portion of the reaction mixture was poured into isopropanol, washed with isopropanol, and dried 16 hours at 50° C. in a vacuum oven. There was an increase in ash content of 0.94 weight percent. The amount of trichlorosilane added was 2 weight percent.

(2)

| | |
|---|---|
| Polybutadiene rubber, 42 ML–4 _____ grams__ | 100 |
| Trichlorosilane _____ml__ | 50 |
| Toluene _____ml__ | 1000 |

The mixture was treated exactly as in (1). There was an increase in ash content of 1.19 weight percent.

It was not possible to obtain a good solution of 200 grams of this rubber in 1000 ml. of toluene. The higher ratio of silane to polymer would favor the rubber.

The above-described finishes were each applied to a woven glass fabric which had been subjected to a heat-cleaning pretreatment to remove lubricants and sizes. The cloth, in each case, was washed with tap water, rinsed with distilled water, and air dried. It was then soaked in a solution of the finish in toluene (solution contained one weight percent polymer). Following the soaking, the cloth was air dried and then baked at 145° C.

| | Liquid Polybutadiene Finish | Polybutadiene Rubber Finish |
|---|---|---|
| Air dried, hours | 18 | 50 |
| Finish soak, hours | 75 | 75 |
| Air dried, hours | 18 | 26 |
| Baked at 145° C., hours | 31 | 31 |

Laminates were prepared using the Fiberglas cloth treated with the two types of finishes and a liquid thermosetting resin composition prepared by blending an unsaturated polyester resin (Atlac LV) with styrene in a ratio of 65/35 parts by weight. This resin was catalyzed with Lupersol DDM (mixture of methyl ethyl ketone peroxide and tricresyl phosphate) using 0.189 gram per 40 ml. of resin, and 0.05 gram per 40 ml. of resin of cobalt naphthenate drier (Uversol cobalt liquid, 6 percent) was added. The laminates were laid up with the fill threads parallel and the plies not nested. Both 12-ply and 45-ply laminates were prepared using Fiberglas cloth with each type of finish. The 12-ply laminates were employed for flexural strength determinations and the 45-ply laminates were employed for bonding strength and impact strength determinations. The laminates were prepared by hand. A portion of the resin was placed on a stainless steel plate followed by a panel of the Fiberglas cloth. The fabric was pressed down to allow the liquid resin composition to work through it. Another portion of the resin was added followed by a panel of fabric, and the process was repeated to give a structure having the desired number of plies. After each application of the resin, the material was distributed over and through the glass fabric as evenly as possible. A steel plate was placed upon the top of the assembly and the mold was tightened with studs to a ⅛ inch or a ½ inch shim. Laminates thus prepared were cured 20 hours at 80° C.

Laminates similar to those described above were prepared using Fiberglas cloth which had been treated in different ways as follows:

(A) Subjected to a heat-cleaning pretreatment to remove lubricants and sizes.
(B) Material from (a) treated with methacrylato chromic chloride.
(C) Material from (a) treated with vinyl trichlorosilane.

Lupersol DDM and cobalt naphthenate were added in the amounts given above except where designated. Properties of the several laminates were determined. Results were as follows:

| Fiberglas Treatment | Flexural Strength, p.s.i. | Bonding Strength, p.s.i. | Impact Strength, ft. lbs.[1] |
|---|---|---|---|
| Liquid polybutadiene-trichlorosilane | 52,200 | 1710 | 32.7 |
| Rubbery polybutadiene-trichlorosilane | 43,500 | 1371 | 32.9 |
| (A) | 43,500 | 1462 | 41.6 |
| (B) | 43,500 | [2]1496 | [2]40.68 |
| (C) | 44,200 | | |

[1] ASTM D-256–47T, cantilever beam test (Izod type).
[2] Hydroquinone (0.033 part by weight), 0.504 part by weight of cobalt naphthenate drier (Uversol cobalt liquid, 6 percent), and 0.199 part by weight Lupersol DDM added per 100 parts resin and laminates were cured 87 hours at 84° C.

Example II

Fiberglas laminates were prepared using the liquid polybutadiene described in Example I as the laminating resin. Fiberglas cloth was employed which had been treated in the five ways described in Example I and also with Garan finish (a vinyl silane). The laminates were laid up with the plies nested and the fill threads parallel. Both 12-ply and 45-ply laminates were prepared using Fiberglas cloth with each type of finish. A vacuum impregnator was employed for preparation of the laminates and curing was effected at 260° C. Physical properties were determined and the following results were obtained:

| Fiberglas Treatment | Cure Time, hrs. | Flexural Strength, p.s.i. | Bonding Strength, p.s.i. | Impact Strength, ft. lbs.[1] |
|---|---|---|---|---|
| Liquid polybutadiene-trichlorosilane | 5 | 33,200 | 1382 | 31.1 |
| Rubbery polybutadiene-trichlorosilane | 5 | 19,700 | 1114 | 19.6 |
| (A) | 7.5 | | 873.2 | 25.29 |
| | 11 | | 1235 | 25.62 |
| (B) | 7.5 | | 1044.5 | 22.00 |
| | 11 | | 1167 | 25.33 |
| (C) | 7.5 | | 1117 | 9.95 |
| Garan Finish [3] | 7.5 | | 1203 | 14.94 |

[3] A vinyl silane commercial finish.

From the above data, it can be seen that much superior flexural strength and bonding strength were obtained in the laminate when the fiber glass is finished with the addition product of this invention as compared to some of the prior art finishes.

We claim:

1. A glass fiber treated with the reaction product of a liquid polymer of a conjugated diene and a silicon halide wherein not more than 75 percent of the double bonds of said polymer are reacted with said silicon halide.

2. A glass fiber coated with the reaction product of a liquid polymer prepared by polymerizing 5 to 100 weight parts of conjugated diene per 100 parts of monomers with sufficient silicon halide to react with 1 to 75 percent of the double bonds in said liquid polymer.

3. A glass fiber finished with a liquid polymer of a conjugated diene prepared by polymerizing 5 to 100 weight parts of said conjugated diene per 100 parts of total monomers said liquid polymer being reacted with sufficient silicon halide to saturate 1 to 75 percent of the double bonds in said polymer, said silicon halide having a formula

$$R_nSiYX_{(3-n)}$$

wherein R is selected from the group consisting of alkyl and alkoxy groups of 1 to 4 carbon atoms and phenyl groups, $n$ is an integer selected from the group consisting of 0, 1 and 2, each X is selected from the group consisting of chlorine and bromine, Y is selected from the group consisting of X and hydrogen.

4. The treated glass fiber of claim 3 wherein the liquid polymer is prepared by sodium polymerization.

5. The treated glass fiber of claim 4 wherein the conjugated diene monomer comprises at least 50 weight parts per 100 parts of total monomers.

6. The treated glass fiber of claim 5 wherein the conjugated diene monomer is butadiene and the remaining monomer is styrene.

7. The treated glass fiber of claim 6 wherein the silicon halide is trichlorosilane.

8. The treated glass fiber of claim 6 wherein the silicon halide is tribromosilane.

9. The glass fiber of claim 6 wherein the silicon halide is methyldichlorosilane.

10. The glass fiber of claim 6 wherein the silicon halide is ethyldichlorosilane.

11. The glass fiber of claim 6 wherein the silicon halide is diethylchlorosilane.

12. A laminate comprising a plurality of glass plies being finished with the reaction product of a liquid polymer of a conjugated diene and a silicon halide reacted therewith in an amount sufficient to saturate 1 to 75 percent of the double bonds of said liquid polymer, said silicon halide having a formula $$R_nSiYX_{(3-n)}$$

wherein R is selected from the group consisting of alkyl and alkoxy groups of 1 to 4 carbon atoms and phenyl groups, $n$ is an integer selected from the group consisting of 0, 1 and 2, each X is selected from the group consisting of chlorine and bromine, Y is selected from the group consisting of X and hydrogen, the thus finished fiber being laminated by means of a resin.

13. The laminate of claim 12 wherein the said liquid polymer is prepared by copolymerizing at least 50 weight parts of 1,3-butadiene per 100 parts of total monomers by mass polymerization.

14. The laminate of claim 13 wherein the liquid polymer is a copolymer of 1,3-butadiene and styrene, the silicon halide is trichlorosilane and the resin is a mixture of a polyester resin and styrene.

References Cited in the file of this patent

UNITED STATES PATENTS

| | | |
|---|---|---|
| 2,469,154 | Bunnell et al. | May 3, 1949 |
| 2,502,286 | Sowa | Mar. 28, 1950 |
| 2,672,425 | Gleason et al. | Mar. 16, 1954 |
| 2,688,006 | Steinman | Aug. 31, 1954 |
| 2,688,007 | Steinman | Aug. 31, 1954 |
| 2,721,873 | MacKenzie et al. | Oct. 25, 1955 |
| 2,723,211 | MacMullen et al. | Nov. 18, 1955 |
| 2,742,378 | Grotenhuis | Apr. 17, 1956 |

OTHER REFERENCES

"Sizes for Glass Textile for Reinforcing Polyester Plastics," by L. P. Biefeld and T. E. Philipps; reprinted from American Dyestuff Reporter, August 18, 1952.